United States Patent [19]

Richardson

[11] 4,204,896
[45] May 27, 1980

[54] PRODUCTION OF CABLE JOINTS

[75] Inventor: John Richardson, Luton, England

[73] Assignee: Hayward Tyler Limited, Bedfordshire, England

[21] Appl. No.: 939,733

[22] Filed: Sep. 5, 1978

[30] Foreign Application Priority Data

Sep. 9, 1977 [GB] United Kingdom ............... 37634/77

[51] Int. Cl.$^2$ .......................... B21F 15/02; B29C 6/02
[52] U.S. Cl. ...................................... 156/49; 156/502; 249/95; 264/85; 264/272; 425/108; 425/802
[58] Field of Search ........................... 156/49, 48, 502; 249/95; 425/108, 802; 264/272, 85

[56] References Cited

U.S. PATENT DOCUMENTS

| | | | |
|---|---|---|---|
| 3,467,561 | 9/1969 | Waride | 156/49 |
| 3,970,488 | 7/1976 | Nelson | 156/49 |
| 4,084,307 | 4/1978 | Schultz | 156/49 |
| 4,091,062 | 5/1978 | Nelson | 156/49 |

*Primary Examiner*—William J. Van Balen
*Attorney, Agent, or Firm*—Pollock, Vande Sande and Priddy

[57] ABSTRACT

The invention relates to a method and apparatus for producing an insulated joint between electrical conductors, particularly between cables insulated by cross-linked polyethylene material. Heat is applied to joined parts of the conductors which have been covered by a cross-linked polyethylene material in uncured condition and closely confined within an enclosure which is heated until the said material is cured, pressure being applied to the joint while the joint is cooling, whereby voids in the cured joint are substantially suppressed. More specifically, parts of cable cores are connected together, the joint and adjacent portions of the cables are covered with the uncured material, the covered joint is heated within a mould until the material is cured, and pressure is applied to the joint while it is cooling. Advantageously, the uncured material is in the form of a tape.

The mould cavity for the joint may be defined by two mould parts and the pressure applied by moving one of them in relation to the other. Alternatively the pressure may be applied by pistons slidable in cylinders communicating with the cavity. In either case the pressure may be applied through spring means.

9 Claims, 9 Drawing Figures

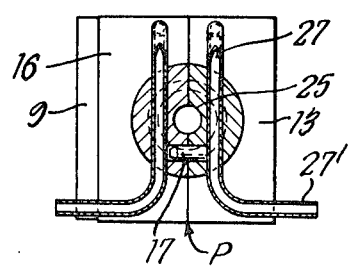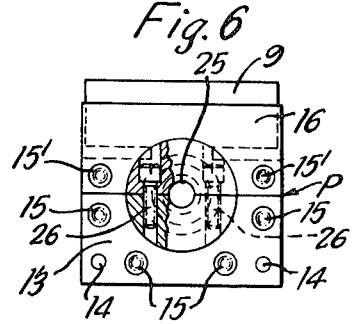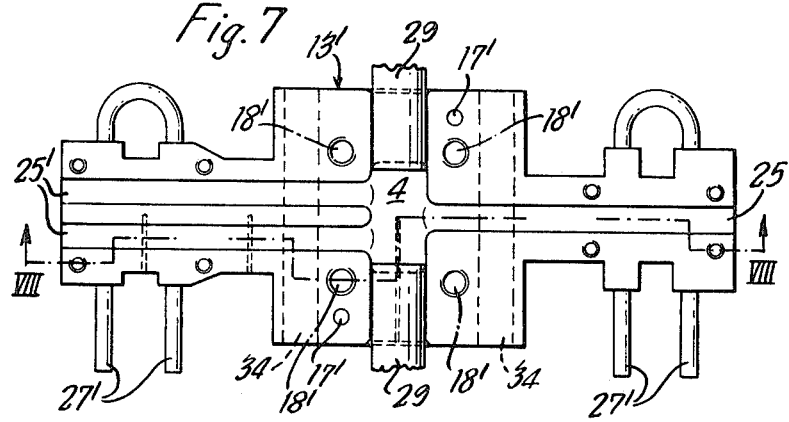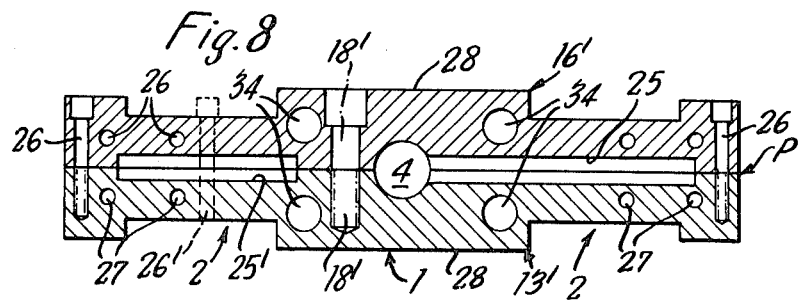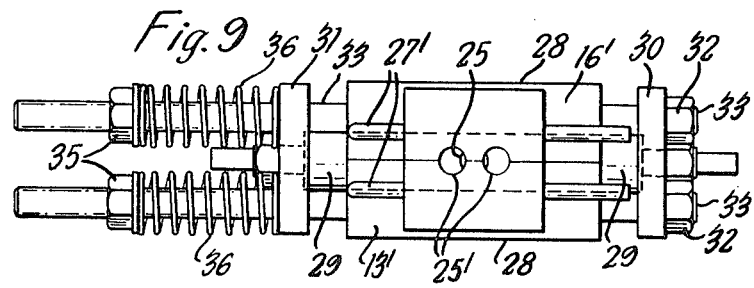

PRODUCTION OF CABLE JOINTS

This invention concerns improvements relating to the production of insulated joints between electrical conductors, particularly joints between cables insulated by cross-linked polyethylene (XLP). It is an object of the invention to provide a method and apparatus whereby good permanent joints can be reliably and effectively produced in simple fashion without, if necessary, the need for a specialist operator.

According to the invention, in a method for producing an insulated joint between electrical conductors, heat is applied to joined parts of the conductors covered by a cross-linked polyethylene material in uncured condition and closely confined within an enclosure, the enclosure being heated until the said material is cured, and pressure is applied to the joint in the enclosure while the said joint is cooling, whereby the formation and/or persistence of voids in the cured joint is substantially suppressed.

A method of producing a joint between cables insulated by cross-linked polyethylene comprises connecting the parts of cable cores together, covering the joint thus produced and adjacent portions of the cables with the polyethylene material in uncured condition, heating the covered joint within a mould until the material is cured throughout its thickness and applying pressure to the cable joint in the mould while the joint is cooling. Generally the parts to be connected will be the ends of cable cores, in which case they may be connected by means of a crimped metal ferrule, the ferrule and adjacent portions of the cables being covered with the uncured polyethylene material.

Suitably the bare ferrule and the cable ends may be covered closely by wrapping them closely in a known tape of the cross-linked material in the uncured condition or by embedding them in particles of the uncured material. Alternatively, however, uncured material may be injected into the closed mould under pressure.

Also in accordance with the invention, apparatus for producing an insulated joint by the aforesaid method comprises a mould adapted for receiving the covered joint and provided with means for applying pressure to the said joint during a period of cooling, and means for heating the covered joint through the mould.

Heat for bringing the joint up to the curing temperature and maintaining that temperature until the covering material is cured sufficiently may be simply provided by means of heated plates, for example electrically heated plates, applied to side surfaces of the mould. If preferred, however, electrical heaters may be built into the mould.

A suitable mould is divided at a horizontal plane, so that a tape-wrapped joint can be placed in its lower half or main body and, after the upper half has been superposed, a sliding body for exerting pressure on the covered joint in the mould cavity can be displaced initially to close the mould and subsequently during the cooling period to exert increased pressure on the joint. The pressure may conveniently be applied through compression springs, acting upon the sliding body and subjected to compression by nuts on vertical studs or tie rods which pass freely through the slide and are fast in the lower half.

Simply, the cooling after discontinuance of heating may be at ambient temperature, although a coolant could be employed. End portions of the mould may be furnished with clamping means to enable respective cable ends to be firmly clamped in relation to the mould cavity. These end portions may in any case have provision for the passage through them of a coolant for preventing excessive heating of and risk of damage to the cable ends. The cooling means may, for example, take the form of water ducts or jackets disposed in or around the end portions. Water cooling during the heating part of the process will prevent cable deformation.

The invention permits of particularly simple forms of method and apparatus in the case of "straight-through" cable joints between two XLP-insulated cable ends. It is, however, also applicable to other kinds of cable joints including so-called "star" joints involving three or more cable ends. Cables of the same or of different sizes and for various purposes, including cables suitable for motor windings, can be jointed.

Embodiments of the invention by way of example will now be more fully described with reference to the accompanying drawings, in which.

Figure 1:
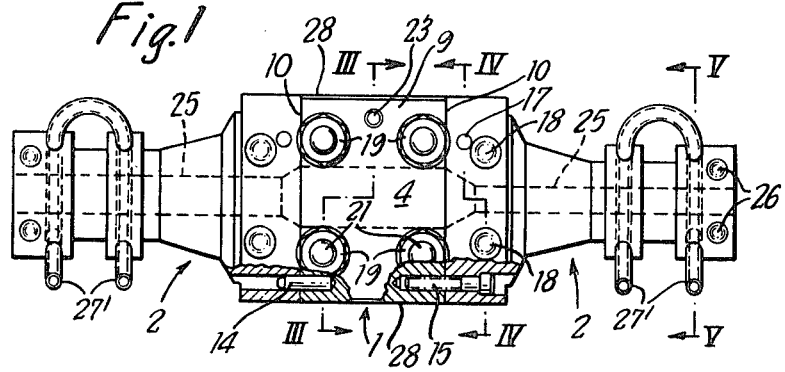
FIG. 1 is a plan view of a mould for a straight-through joint.
Figure 2:
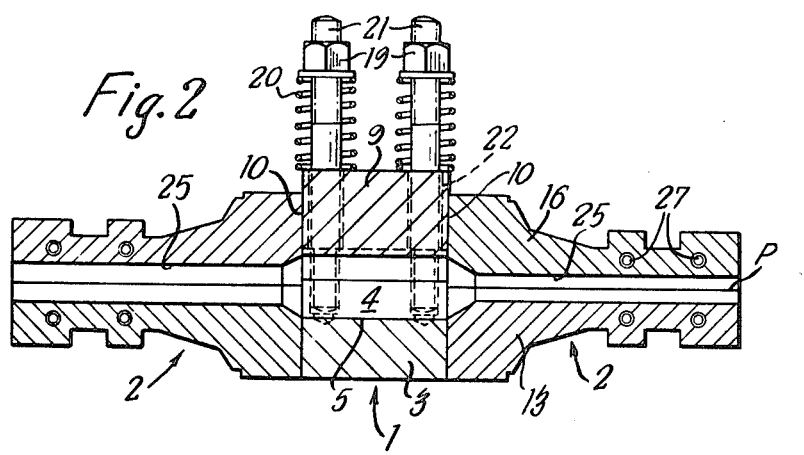
FIG. 2 is a vertical longitudinal section through the mould.
Figure 3:
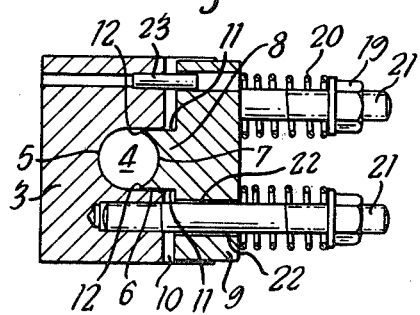
Figure 4:
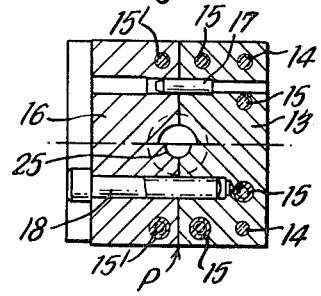

FIG. 3 a cross section at III—III in FIG. 1,

FIG. 4 a cross section at IV—IV in FIG. 1,

FIG. 5 a cross section at V—V in FIG. 1,

FIG. 6 an end view, partly broken away, of the mould, as seen in FIG. 2,

FIG. 7 a plan view of the lower half of a mould for a "star" joint,

FIG. 8 a vertical longitudinal section, at VIII—VIII in FIG. 7, of the mould shown in FIGS. 7 and 8, and FIG. 9 an end view thereof.

The mould illustrated in FIGS. 1 to 6 consists generally of upper and lower halves separated on a plane P (FIG. 2). Functionally it comprises a main mould body 1 and bushes 2, serving as cable-entry and clamping elements, attached to respective ends of that body. The lower half 3 of the mould body bounds the lower half of the substantially cylindrical mould cavity 4 by a half-cylindrical portion 5, which is surmounted by an upwardly open parallel-sides portion 6 (FIG. 3). The upper part of the cavity 4 is bounded by a concave surface 7, of substantially half-cylindrical form, complementary to that of the surface 5 in the mould half 3. The surface 7 is formed in the lower side of a downwardly projecting rib 8 integral with a rectangular block 9 slidably guided for vertical movement between the end faces 10 of the bushes 2, the parallel sides 11 of the rib 8 being a sliding fit in the parallel-sided upper portion 6 in the mould half 3. Narrow, radiused, lips 12 bound the surface 7 at the longitudinal edges. Clearances between the sliding block 9 and the parts 2 and 3 are kept small to avoid extrusion of hot material from the mould in use.

Each bush 2 consists of a lower portion 13 located and releasably connected to the lower mould half 3 by means of dowels 14 and studs 15 (FIG. 1) and an upper portion 16 located and releasably connected to the lower portion 13 by means of dowels 17 and studs 18 (FIG. 4), as well as by studs 15' to the mould half 3.

In the assembled condition of the mould, the block 9 can be forced into the mould body by tightening nuts 19, which bear on the block through compression springs 20, on four studs 21 which are fast in the lower mould half 3 and pass freely through plain holes 22 in the block. A dowel 23 (FIG. 3) assists in the location of the block 9.

Axial holes 25 for receiving the cables (not shown) to be connected are formed in the divided bushes 2 and open by flared (as shown) or radiused ends into the mould cavity 4 (FIG. 2). The diameters of the holes 25 are selected so as closely to embrace and clamp the cables respectively to be received (FIG. 2 shows holes 25 of different diameters by way of illustration). In addition to cable-clamping pressure resultant from tightening of the studs 18, pressure can be applied locally at the ends of the bushes 2 by studs 26 (FIG. 6). The extremeties of the lower and upper portions 13, 14 of the bushes 2 are provided with bores 27 which receive pipes 27' for the passage of cooling water.

The manner of use of the above-described mould is as follows:

The ends of cables to be connected are bared by stripping off sufficient XLP insulation to allow the conductors to enter a connection ferrule equally and fully, but ensuring that the insulation butts against the ferrule. Each conductor is then crimped into the ferrule, typically using a hexagonal crimping tool. The insulation adjacent to the ferrule is abraded and thoroughly cleaned with a solvent, suitably Toluene, using a lint-free cloth.

The assembly of cables and ferrule is lightly gripped in a vice and chemically cross-linked, uncured, polyethylene tape, suitably of natural grade HFDG 4201 (0.25 mm thick) supplied by Bakelite Xylonite Ltd, Grangemouth Scotland, is applied to the assembly, building up the layers until the taped joint will be a firm fit in the mould cavity 4. For convenience of application, the tape may be cut into 30–40 cm lengths, each length being wiped clean with the aforesaid solvent or with toluene before application. If each length is stretched before being applied, the pretension produced assists in the production of a tight void-free joint. Starting from one end of the joint, the tape is so applied, passing it over the top of the assembly away from the operator, that a 50% overlap is obtained. A change of tape direction can be achieved by a single twist thereof.

With the upper half of the mould removed from the lower half the mould surfaces are checked for perfect cleanliness and the taped joint is laid centrally in the half cavity 5 in the lower mould half 3 and the cables in the lower halves of the holes 25. The joint should be a tight fit in the mould with no appreciable gap. The upper mould half is placed in position to close the mould and the studs 18 are tightened to ensure effective clamping of the cables to prevent them from moving axially under pressure in the mould and to assist in holding the block 9 in position axially. The block 9 is then lowered on to the joint and light pressure is applied by the nuts 19 through the springs 20 (not more than 1.25 mm compression of the springs). Water is supplied through the pipes 27' so as to maintain the cable-clamping means at a moderate temperature, suitably 45° C.

The mould is placed in a platen-type heater with its plane, unencumbered, faces (FIG. 1) between the heating plates of the heater and is clamped therein. The mould is heated until a uniform temperature, measured by thermcouples (not shown), of 180° C. of the mould body is attained, this temperature being maintained for 1 hour. The mould is then removed from the heater and pressure is applied to the joint in the cavity 4 through the springs 20 by turning the nuts 19 evenly so that the springs are compressed by 4.5 to 5 mm. This pressure, typically 1.5 MPa, takes up shrinkage of the wrapped joint during the subsequent cooling at ambient temperature. When the temperature has fallen below 50° C., the mould can be opened and the joint and cables removed. Flashes are removed and the joint cleaned, inspected and tested.

Cleanliness is essential at all stages and hands, tools and equipment should be cleaned with solvent before use to achieve this purpose.

Except as hereinafter described, the mould illustrated in FIGS. 7 to 9 is similar to that of FIGS. 1 to 6 and the same reference numerals indicate like parts. This mould is intended for the production of "star" joints, in this case between three cables one of which enters from one end through a hole 25 and the other two from the opposite end through parallel holes 25'. If additional clamping force is required, further clamping studs 26' may be provided at the latter end. The bushes 2 are integral with the body 1 and the lower and upper mould parts 13'16', separable at the plane P, are of generally mirror-image form and are located and secured together by dowels 17' and four studs at 18', as well as by the studs 26, 26'. The mould cavity 4, which serves to accommodate a three-hole crimping ferrule for the ends of the three conductors, is a cylindrical cavity extending transversely of the holes 25, 25', which open into it, one half of the cavity being formed in each half of the mould body when the latter is assembled. The ends of the cavity 4 are closed by pistons 29 which are a close sliding fit in it. The pistons 29 are movable inwardly of the cavity for exerting pressure upon the taped joint for the purpose previously described. To this end the pistons 29 are connected to respective crosshead plates 30, 31 (FIG. 9). At one end, the plate 30 is abutted against nuts 32 on the ends of four long studs 33 which pass freely through bores 34, extending, parallel to the cavity 4, through the mould body. The plate 31 at the other end is freely slidable on plain portions of the four studs 33 and is abutted against nuts 35 through compression springs 36 encircling the studs. By tightening the nuts 35, the pistons 29 can be drawn inwards of the cavity to exert pressure on the taped joint in the latter, initially under slight compression of the springs 36 and subsequently under greater compression, as described above. The manner of operation is the same, in essential respects, as that previously described and will be readily understood without further explanation.

As an alternative for the polyethylene tape, use may be made of granules of uncured cross-linked polyethylene. In this case, the prepared assembly of thimble and cable ends is accommodated in the mould cavity in a bed of the particles and with a covering thereof, and the joint thus surrounded by particles is heat cured with the application of pressure during cooling as in the case of the wrapped joint.

Joints capable of satisfying exacting conditions can be produced by the method and apparatus of the invention, for instance adequate insulation for high voltage under conditions of access of water to the joint, as well as good electrical and mechanical connection.

I claim:

1. A method for producing a joint, between a plurality of cables, insulated by cross-linked polyethylene material, comprising connecting electrically conductive parts of said cables together, covering the electrical joint thus produced and adjacent portions of the cables with cross-linked polyethylene material in uncured condition, placing the said covered electrical joint and adjacent cable portions in a mould, closing the mould with the said joint and cable portions enclosed with a tight fit therein, heating the enclosed joint within the mould until the said polyethylene material is cured throughout its thickness, cooling the joint in the mould, and, during the cooling of the joint, producing compression over at least substantially the whole of the joint by applying pressure mechanically to at least one relatively movable wall part of the mould in contact with the said material, whereby the formation and persistence of voids in the cured joint is substantially suppressed.

2. A method according to claim 1, wherein the polyethylene material is in the form of a tape, which is applied closely to the joint.

3. A method according to claim 1 wherein, preceding said covering step, the cable ends are connected by compressing over them a hollow metal body, the said body being thereafter covered by the polyethylene material.

4. A method according to claim 1 wherein the heating step is effected through the mould by applying heat to exterior surfaces of the mould.

5. Apparatus for producing an insulated joint between a plurality of cables which joint is insulated by cross-linked polyethylene material, said apparatus comprising a divided mould having at least two parts which are complementarily shaped to define, when said parts are juxtaposed to close the mould, an interior cavity for receiving, with a tight fit, a cable joint covered by cross-linked polyethylene material in uncured condition, means for closing said mould to define said interior cavity, means for heating said mould to cure the said cross-linked polyethylene covering material when said covered joint is in said cavity, and means in said mould for cooling said joint after said material has been cured, said mould including at least one wall adjacent said interior cavity which is movable relative to said cavity and operable to apply and maintain mechanical pressure on said joint during the cooling of said covered joint.

6. Apparatus according to claim 5 wherein said movable wall comprises piston means slidable in cylinder means communicating with the mould cavity for applying and maintaining the said pressure to the said joint during the cooling of the joint.

7. Apparatus according to claim 5 wherein the said mechanical pressure is applied to said joint and maintained on said joint through spring means during the cooling of the joint.

8. Apparatus according to claim 5, wherein the mould is provided with clamping means for holding the said cables in place while the covered joint is in the mould cavity.

9. Apparatus according to claim 5, wherein the mould has unobstructed exterior side surfaces to which heated plates can be applied for heating the mould.

* * * * *